US010745985B2

(12) United States Patent
Miller et al.

(10) Patent No.: US 10,745,985 B2
(45) Date of Patent: Aug. 18, 2020

(54) RIG-FLOOR PIPE LIFTING MACHINE

(71) Applicant: National Oilwell Varco, L.P., Houston, TX (US)

(72) Inventors: Travis James Miller, Cypress, TX (US); Frank Benjamin Springett, Spring, TX (US)

(73) Assignee: NATIONAL OILWELL VARCO, L.P., Houston, TX (US)

( * ) Notice: Subject to any disclaimer, the term of this patent is extended or adjusted under 35 U.S.C. 154(b) by 0 days.

(21) Appl. No.: 15/978,765

(22) Filed: May 14, 2018

(65) Prior Publication Data

US 2018/0334865 A1 Nov. 22, 2018

Related U.S. Application Data

(60) Provisional application No. 62/506,813, filed on May 16, 2017.

(51) Int. Cl.
| | | |
|---|---|---|
| *E21B 19/24* | (2006.01) | |
| *E21B 19/00* | (2006.01) | |
| *E21B 44/00* | (2006.01) | |
| *B66F 9/18* | (2006.01) | |
| *B66C 1/44* | (2006.01) | |
| *G05D 1/02* | (2020.01) | |
| *B66F 9/065* | (2006.01) | |
| *B66F 9/06* | (2006.01) | |

(Continued)

(52) U.S. Cl.
CPC ............ *E21B 19/24* (2013.01); *B66F 9/061* (2013.01); *B66F 9/065* (2013.01); *B66F 9/18* (2013.01); *E21B 19/00* (2013.01); *E21B 19/20* (2013.01); *G05D 1/028* (2013.01); *G05D 1/0255* (2013.01); *B66C 1/04* (2013.01); *B66C 1/44* (2013.01); *G05D 2201/0202* (2013.01)

(58) Field of Classification Search
None
See application file for complete search history.

(56) References Cited

U.S. PATENT DOCUMENTS

| | | | | |
|---|---|---|---|---|
| 4,591,006 A | * | 5/1986 | Hutchison | E21B 19/20 175/52 |
| 4,738,321 A | * | 4/1988 | Olivier | E21B 19/14 175/85 |
| 7,726,929 B1 | | 6/2010 | Orgeron | |

(Continued)

FOREIGN PATENT DOCUMENTS

WO 0123701 A1 4/2001

OTHER PUBLICATIONS

PCT International Search Report and Written Opinion dated Aug. 17, 2018 for WO Application No. PCT/US2018/032542, 10 pages.

(Continued)

*Primary Examiner* — Matthew R Buck
*Assistant Examiner* — Douglas S Wood
(74) *Attorney, Agent, or Firm* — Jonathan Pierce; Pierre Campanac; Porter Hedges LLP

(57) ABSTRACT

A system for handling pipes on a drilling rig includes an elevator suspended from a stand transfer vehicle, a top drive or other lifting device of a drilling rig. The system also includes a rig-floor pipe lifting machine including a fork sized to engage a tool-joint of a pipe. A navigation system includes a controller that can be programmed to autonomously drive the rig-floor pipe lifting machine.

26 Claims, 12 Drawing Sheets

(51) Int. Cl.
*E21B 19/20* (2006.01)
*B66C 1/04* (2006.01)

(56) References Cited

U.S. PATENT DOCUMENTS

| | | |
|---|---|---|
| 2006/0081379 A1 | 4/2006 | Fehres et al. |
| 2006/0104747 A1 | 5/2006 | Zahn et al. |
| 2006/0231344 A1 | 10/2006 | Drzewiecki |
| 2007/0181373 A1* | 8/2007 | Tygard .................... B66F 9/148 187/222 |
| 2008/0296065 A1 | 12/2008 | Standal |
| 2009/0283324 A1 | 11/2009 | Konduc |
| 2010/0193198 A1 | 8/2010 | Murray et al. |
| 2011/0048860 A1* | 3/2011 | Lewis ....................... B66F 9/08 187/227 |
| 2011/0079434 A1 | 4/2011 | Belik et al. |
| 2012/0018222 A1 | 1/2012 | Hankins et al. |
| 2015/0275596 A1 | 10/2015 | Hickie |
| 2015/0354293 A1* | 12/2015 | Kannegaard .......... E21B 19/143 166/77.1 |
| 2016/0123094 A1* | 5/2016 | Amezaga .............. E21B 19/165 166/380 |
| 2017/0234088 A1 | 8/2017 | Orr et al. |

OTHER PUBLICATIONS

Examination Report issued by the GCC Patent Office dated Nov. 26, 2019 for corresponding Application No. GC 2018-35302 filed on May 15, 2018 in the name of National Oilwell Varco, L.P. for Rig-Floor Pipe Lifting Machine, 4 pages.

* cited by examiner

RIG-FLOOR PIPE LIFTING MACHINE

CROSS-REFERENCE TO RELATED APPLICATIONS

This application claims priority to U.S. Application Ser. No. 62/506,813 filed on May 16, 2017, which is incorporated herein by reference.

BACKGROUND

This disclosure relates generally to apparatus and methods for handling pipes on a drilling rig, such as a land rig, a jack-up rig or a floater rig. This disclosure relates more particularly to a machine that lifts the lower part of a pipe and displaces the lower part of the pipe on the rig-floor.

U.S. Pat. App. Pub. No. 2011/0079434 illustrates a handling system that can be used to store drill pipes in a setback area. A stand of drill pipe is disconnected from a drillstring and its lower end is guided by a pipe guide. The pipe guide is extendable and includes rollers that engage with the stand. Then, the pipe guide is disengaged and a pipe mover is used to move the stand to a desired storage position in the setback area. The pipe mover includes an engagement finger, an actuator or lift cylinder, a push/pull mechanism, and a sled slidably coupled to a rotating table.

SUMMARY

This disclosure describes a rig-floor pipe lifting machine that may be used, for example, to transfer pipes between a well center, a setback area, a vee-door area, or other areas of a rig-floor. The rig-floor pipe lifting machine comprises a frame.

The rig-floor pipe lifting machine may comprise a pair of swing arms. The pair of swing arms may be rotatable relative to the frame around a first axis. A hydraulic cylinder may have a first cylinder end coupled to at least one of the pair of swing arms and a second cylinder end coupled to the frame. Upon extension and/or contraction of the hydraulic cylinder, the pair of swing arms rotate around the first axis relative to the frame. The pair of swing arms may further be rotatable relative to the frame around a second axis, the second axis being perpendicular to the first axis. At least one spring may have a first spring end coupled to one of the pair of swing arms and a second spring end coupled to the frame. The first spring end may be offset relative to the second axis around which the pair of swing arms is rotatable relative to the frame. The at least one spring may return the pair of swing arms into an even orientation.

A plurality of wheels may be mounted on the pair of swing arms. For example, the plurality of wheels may comprise a first wheel coupled to one of the pair of swing arms at a first distance from the first axis, a second wheel coupled to another one of the pair of swing arms at the first distance from the first axis, and/or a caster coupled to the pair of swing arms or to the frame at a second distance from the first axis. The second distance may be shorter than the first distance. Upon rotation of the pair of swing arms relative to the frame, the caster may be lifted from the rig-floor.

A first motor may be rotationally coupled to a first one of the plurality of wheels. A second motor may be rotationally coupled to a second one of the plurality of wheels. For example, the first motor and/or the second motor are hydraulic motors. The first motor may optionally be driven independently from the second motor so that the first one of the plurality of wheels may be driven at a speed that is different from the speed at which the second one of the plurality of wheels is driven, and the rig-floor pipe lifting machine may turn.

The rig-floor pipe lifting machine may comprise a fork sized to engage a tool joint of a pipe. The fork may be coupled to the frame. For example, the fork may include a first cylindrical inner surface having a first diameter sized to fit around a pin base of the pipe. The fork may further include a second cylindrical inner surface having a second diameter sized to fit around the tool joint of the pipe. The fork may also include a shoulder surface radially sized to support a primary shoulder of a connection of the pipe. A pair of prongs may be disposed above the shoulder surface and separated by a distance shorter than a tool-joint diameter. The rig-floor pipe lifting machine may also comprise a concave pad aligned with the fork. The concave pad may be coupled to the frame. In use, a pipe may be contacting both the fork and the concave pad, so that the frame may be constrained along the same inclination as the pipe.

The rig-floor pipe lifting machine may comprise a gripper arm. The gripper arm may be movable between a first position that is essentially vertical and a second position that is essentially horizontal. The gripper arm may have a first end and a second end, the first end of the gripper arm being rotatably coupled to the frame. A first pipe holding means may be coupled to the second end of the gripper arm. In use, the gripper arm may be used to briefly secure the rig-floor pipe lifting machine to a drillstring.

The rig-floor pipe lifting machine may comprise a tailing arm. The tailing arm may have a first end and a second end, the first end of the gripper arm being rotatably coupled to the frame. A second pipe holding means may be rotatably coupled to the second end of the tailing arm. The tailing arm may be movable between a first position wherein the second pipe holding means is located above the fork, and a second position wherein the second pipe holding means is located above the first pipe holding means when the gripper arm is essentially horizontal. In use, the tailing arm may be used to control the position of the lower part of a pipe suspended above the rig floor.

The rig-floor pipe lifting machine may comprise a navigation system, including a controller. The controller may be programmed to autonomously drive at least one of the plurality of wheels.

In some embodiments, the navigation system may include a movable marker mounted on a stand transfer vehicle. The navigation system may also include a position sensor mounted on the rig-floor pipe lifting machine. The position sensor may generate signals indicative of a distance between the position sensor and the movable marker. In some embodiments, the navigation system may include a plurality of fixed markers mounted on a rig-floor. The navigation system may also include a position sensor mounted to the rig-floor pipe lifting machine. The position sensor may generate signals indicative of a distance between the position sensor and each of the plurality of fixed markers. In some embodiments, the navigation system may include a link attached between the rig-floor pipe lifting machine and a rig-floor. The navigation system may also include a plurality of position sensors mounted on the link. Each of the plurality of position sensors may generate signals indicative of a position or a movement of the link.

This disclosure also describes a system comprising the rig-floor pipe lifting machine and an elevator suspended from one of a stand transfer vehicle, a top drive or other lifting device of a drilling rig.

BRIEF DESCRIPTION OF THE DRAWINGS

For a more detailed description of the embodiments of the present disclosure, reference will now be made to the accompanying drawings, wherein.

DETAILED DESCRIPTION

Figure 1:
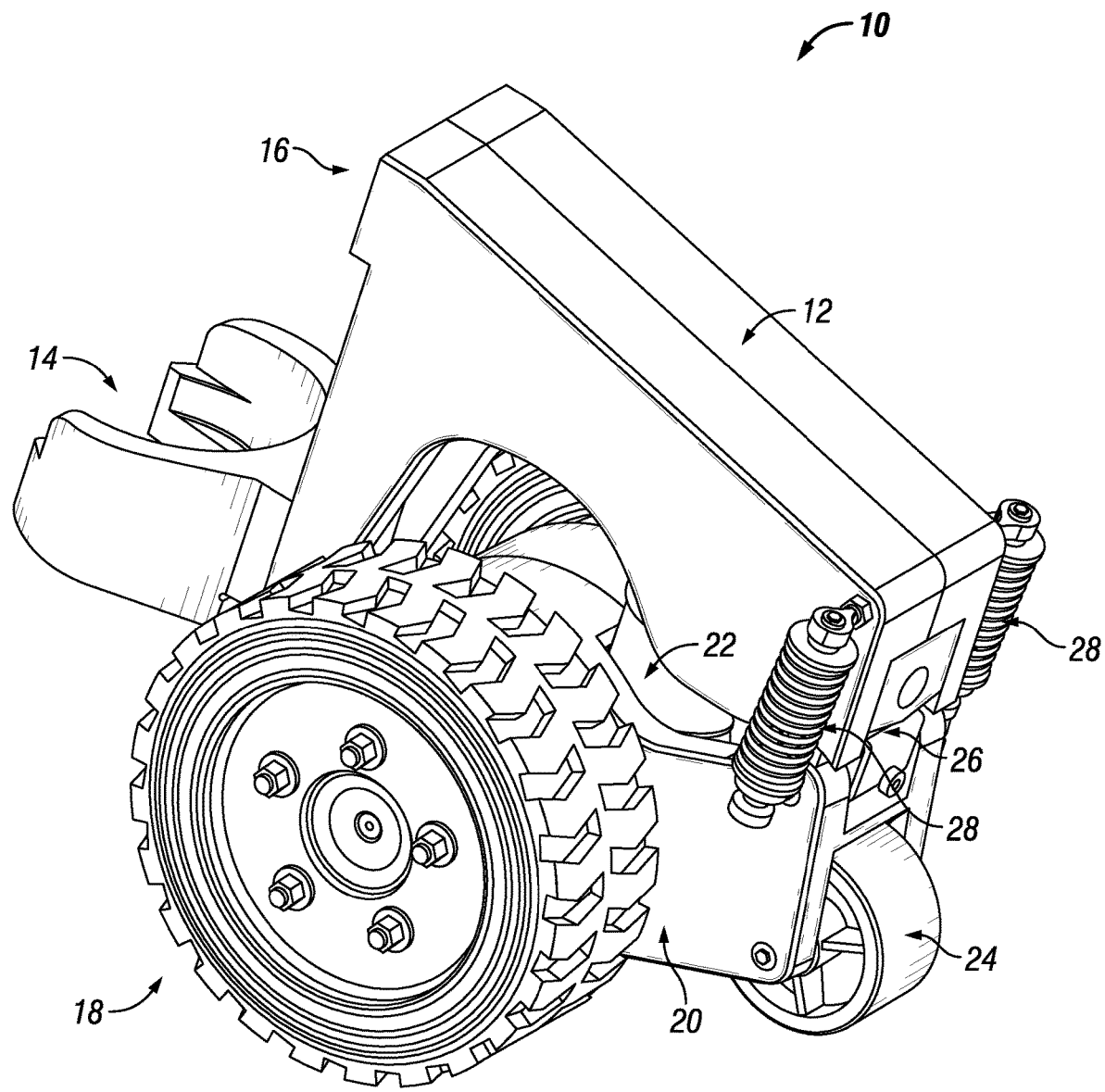
FIG. 1 is a perspective view of a rig-floor pipe lifting machine in accordance with one embodiment.

It is to be understood that the following disclosure describes several exemplary embodiments for implementing different features, structures, or functions of the invention. Exemplary embodiments of components, arrangements, and configurations are described below to simplify the disclosure; however, these exemplary embodiments are provided merely as examples and are not intended to limit the scope of the invention. Additionally, the disclosure may repeat reference numerals and/or letters in the various exemplary embodiments and across the Figures provided herein. This repetition is for the purpose of simplicity and clarity and does not in itself dictate a relationship between the various exemplary embodiments and/or configurations discussed in the various Figures. Finally, the exemplary embodiments presented below may be combined in any combination of ways, i.e., any element from one exemplary embodiment may be used in any other exemplary embodiment, without departing from the scope of the disclosure.

All numerical values in this disclosure may be approximate values unless otherwise specifically stated. Accordingly, various embodiments of the disclosure may deviate from the numbers, values, and ranges disclosed herein without departing from the intended scope. Moreover, the formation of a first feature over or on a second feature in the description that follows may include embodiments in which the first and second features are formed in direct contact, and may also include embodiments in which additional features may be formed interposing the first and second features, such that the first and second features may not be in direct contact.

In the following discussion and in the claims, the terms "including" and "comprising" are used in an open-ended fashion, and thus should be interpreted to mean "including, but not limited to." Furthermore, as it is used in the claims or specification, the term "or" is intended to encompass both exclusive and inclusive cases, i.e., "A or B" is intended to be synonymous with "at least one of A and B," unless otherwise expressly specified herein.

Certain terms are used throughout the following description and claims to refer to particular components. As one skilled in the art will appreciate, various entities may refer to the same component by different names, and as such, the naming convention for the elements described herein is not intended to limit the scope of the invention, unless otherwise specifically defined herein. Further, the naming convention used herein is not intended to distinguish between components that differ in name but not function.

FIG. 1 illustrates a first embodiment of a rig-floor pipe lifting machine 10. The rig-floor pipe lifting machine 10 comprises a frame 12. To move on the rig-floor, the rig-floor pipe lifting machine 10 further comprises a pair of swing arms 20 that may be rigidly coupled to each other, and a plurality of wheels 18, 24 mounted on the pair of swing arms 20. The pair of swing arms 20 may be coupled to the frame 12 via a linkage 26 that permits rotation between the pair of swing arms 20 and the frame 12. To carry a lower end of a pipe, the rig-floor pipe lifting machine 10 further comprises a fork 14 attached to the frame 12 and sized to engage a tool joint of the pipe, and a concave pad 16 attached to the frame 12 and aligned above the fork 14. To lift the lower end of the pipe, the rig-floor pipe lifting machine 10 further comprises a hydraulic cylinder 22 having a first cylinder end coupled to the pair of swing arms 20 and a second cylinder end coupled to the frame 12.

In use, the lower part of the pipe may be pressing on the fork 14 and against the concave pad 16. The upper part of the pipe may only be stabilized with an elevator (not shown) or constrained between beams of a fingerboard so that the pipe does not topple over. As such, the rig-floor pipe lifting machine 10 supports a significant portion of the weight of the pipe. Having a significant portion of the weight of the pipe supported by the rig-floor pipe lifting machine 10 may ensure that the plurality of wheels 18 are firmly pressed against the rig-floor so that the plurality of wheels 18 have sufficient traction to avoid slippage on the rig-floor. Without sufficient traction between the plurality of wheels 18 and the rig-floor, the lower part of the pipe may swing, and the position of the lower part of the pipe may not be sufficiently controlled.

Figure 2:
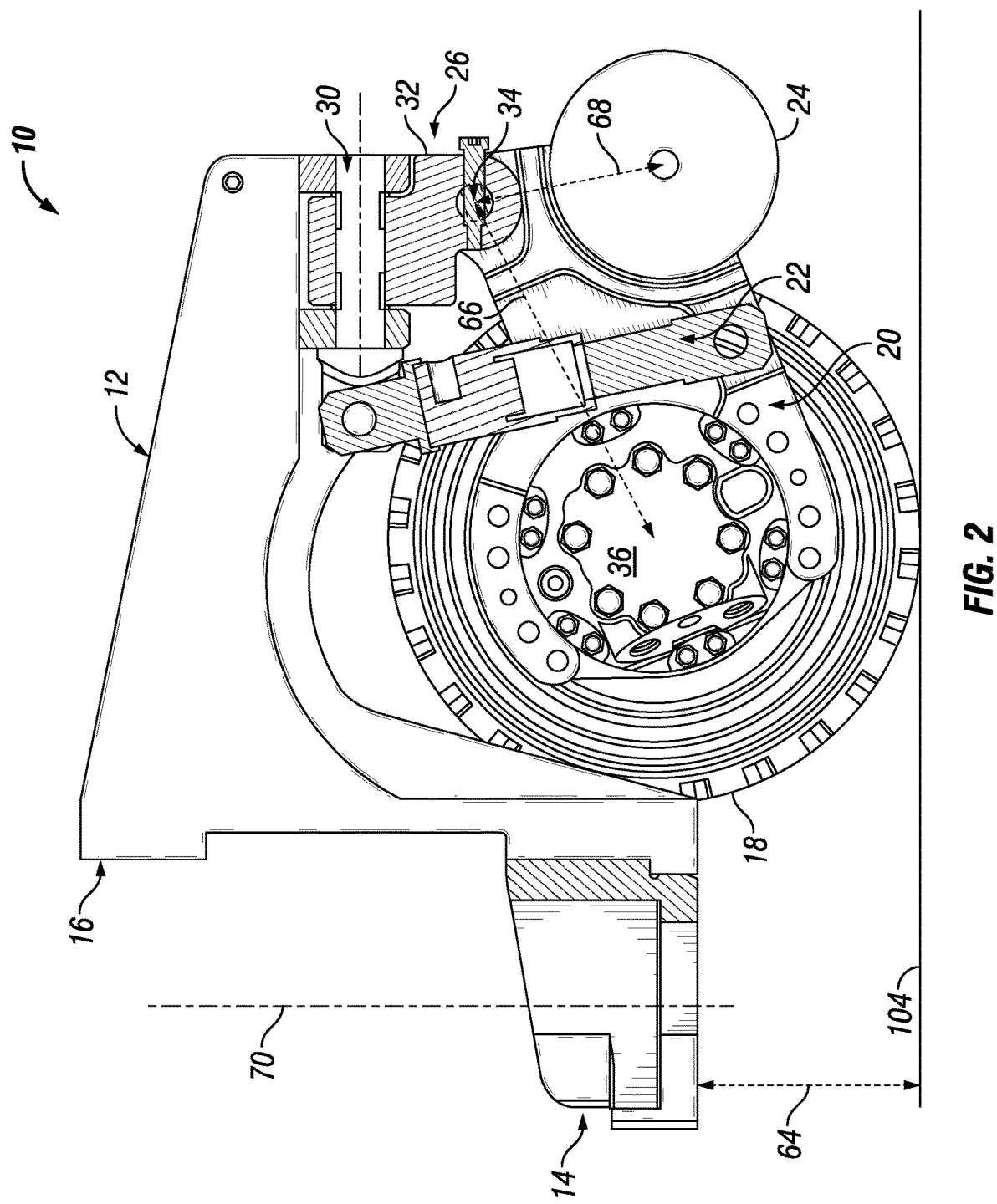
FIG. 2 is a sectional view of the rig-floor pipe lifting machine shown in FIG. 1.

Turning to FIG. 2, the linkage 26 may comprise a link 32 that is coupled at one end to an axle 34. The axle 34 is coupled to the pair of swing arms 20 via a first hinge joint. Accordingly, the pair of swing arms 20 is rotatable relative to the link 32 around a first axis. As the hydraulic cylinder 22 extends, the pair of swing arms 20 may rotate relative to the link 32 and the frame 12 around the first axis.

The link 32 is also coupled at another of its ends to an axle 30 via a second hinge joint. The axle 30 may be attached to the frame 12. Accordingly, the link 32 is rotatable relative to the frame 12 around a second axis, the second axis being perpendicular to the first axis. As the rig-floor pipe lifting machine 10 passes over minor changes in elevation of the rig-floor 104, the pair of swing arms 20 and the link 32 may rotate relative to the frame 12 around the second axis. Returning briefly to FIG. 1, one or more springs 28 each having a first spring end coupled to one of the pair of swing arms 20 and a second spring end coupled to the frame 12 may optionally be provided to bias the pair of swing arms 20 into a particular orientation (i.e., an even orientation) relative to the frame 12. Each first spring end of the one or more springs 28 may preferably be offset relative to the second axis.

Continuing with FIG. 2, the rig-floor pipe lifting machine 10 may further comprise a first motor 36 rotationally coupled to a first one of the plurality of wheels 18 and attached to one of the pair of swing arms 20. Similarly, the rig-floor pipe lifting machine 10 may further comprise a second motor (not shown) rotationally coupled to a second one of the plurality of wheels 18 and attached to the other one of the pair of swing arms 20. The first motor 36 may be driven independently from the second motor. In the example shown, the first motor 36 and the second motor are hydraulic motors. Other types of motors may also be used.

In use, the first one of the plurality of wheels 18 may be driven at a speed that is different from the speed at which the second one of the plurality of wheels 18 is driven. Accordingly, the rig-floor pipe lifting machine 10 may effect a turn on the rig-floor.

Referring still to FIG. 2, the plurality of wheels 18 may preferably comprise a first wheel coupled to one of the pair of swing arms 20 at a first distance 66 from the first axis corresponding to rotation around the axle 34, and a second wheel coupled to another one of the pair of swing arms 20 at the same first distance 66 from the first axis. The plurality of wheels 18 may further comprise a caster 24 coupled between the pair of swing arms 20 at a second distance 68 from the first axis. The second distance 68 may be shorter than the first distance 66.

In use, the hydraulic cylinder 22 may be extended as illustrated in FIG. 2, thereby rotating the pair of swing arms 20 relative to the frame 12 around the first axis. When a pipe is contacting the fork 14 and the concave pad 16, the movement of the frame 12 may be constrained along an inclination 70, for example, a vertical inclination. Accordingly, extension of the hydraulic cylinder 22 causes the frame 12, the fork 14 and the concave pad 16 to be lifted from the rig-floor by an elevation 64. Because the second distance 68 is shorter than the first distance 66, the course of the caster 24 is shorter than the course of the first and second wheels 18. Accordingly, extension of the hydraulic cylinder 22 also causes the caster 24 to be lifted from the rig-floor 104. As such, the caster 24 may not hinder the rig-floor pipe lifting machine 10 from being inclined as the upper part of the pipe is displaced.

Figure 3:
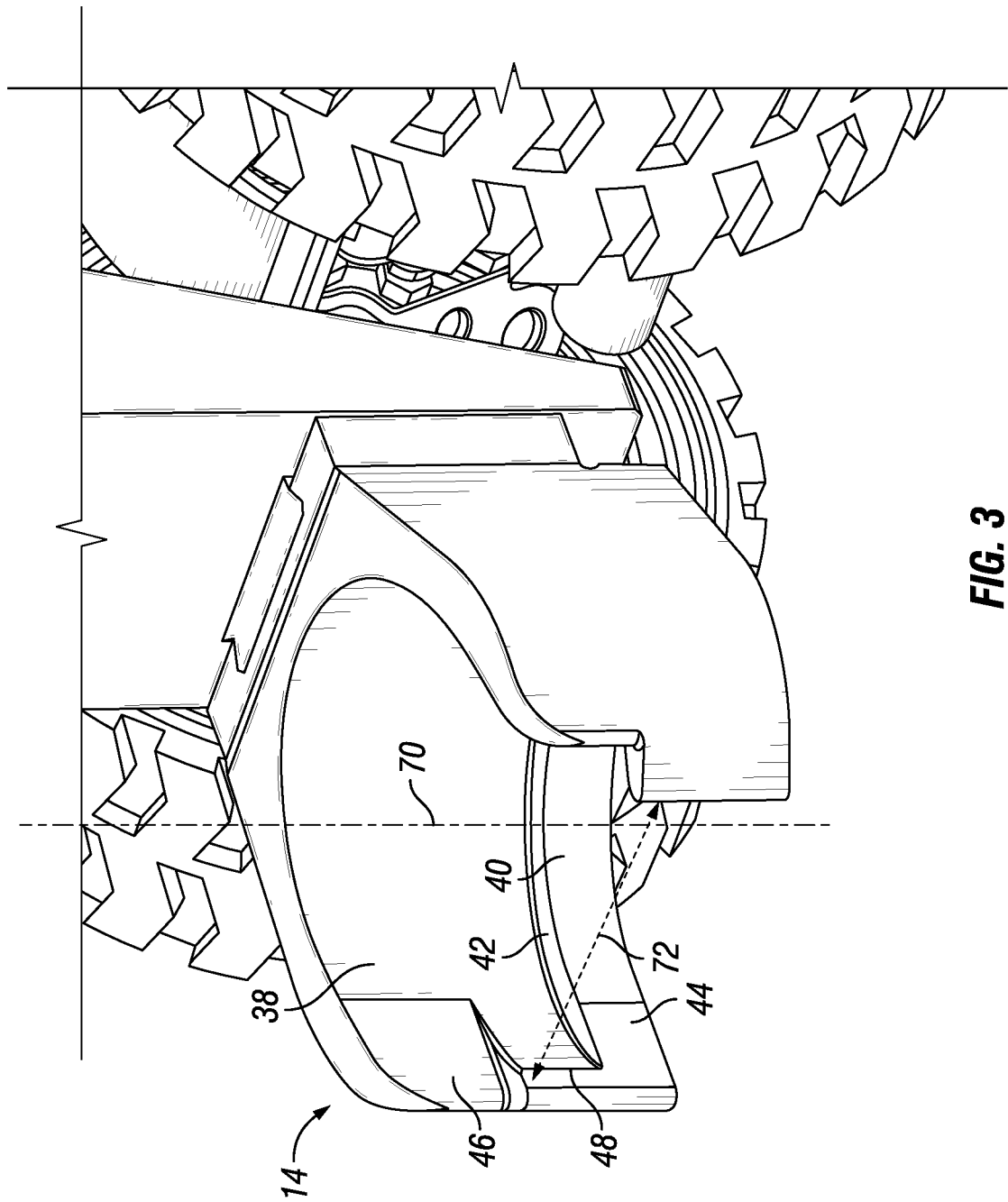
FIG. 3 is a perspective view of the fork of the rig-floor pipe lifting machine shown in FIG. 1.

Turning to FIG. 3, the fork 14 may include a first cylindrical inner surface 40 having a first diameter sized to fit around a pin base of the pipe. The fork 14 may further include a shoulder surface 42 radially sized to receive a primary shoulder of a connection of the pipe. The fork 14 may further include a pair of prongs 48 disposed above the shoulder surface 42 and separated by a distance 72 that is shorter than a tool joint diameter. The fork 14 may further include a second cylindrical inner surface 38 having a second diameter sized to fit around the tool joint of the pipe. The first cylindrical inner surface 40 may be semi-cylindrical. The first cylindrical inner surface 40 may be prolonged with flat surface 44. Similarly, the second cylindrical inner surface 38 may also be semi-cylindrical. The second cylindrical inner surface 38 may be prolonged with flat surface 46.

In use, the prongs 48 and the second cylindrical inner surface 38 engage a lateral surface of the connection of the pipe and secure the lower part of the pipe laterally. The shoulder surface 42 engages the primary shoulder of the connection of the pipe and supports a significant portion of the weight of the pipe. The first cylindrical inner surface 40 provides an opening through which the pin base of the pipe may pass. Additionally, when the pipe presses against the concave pad 16, the inclination of the frame 12 may further be constrained to the inclination 70 (i.e., the pipe inclination). The flat surfaces 44, 46 may guide the fork 14 toward the pipe as the rig-floor pipe lifting machine 10 approaches the pipe.

Figure 4:
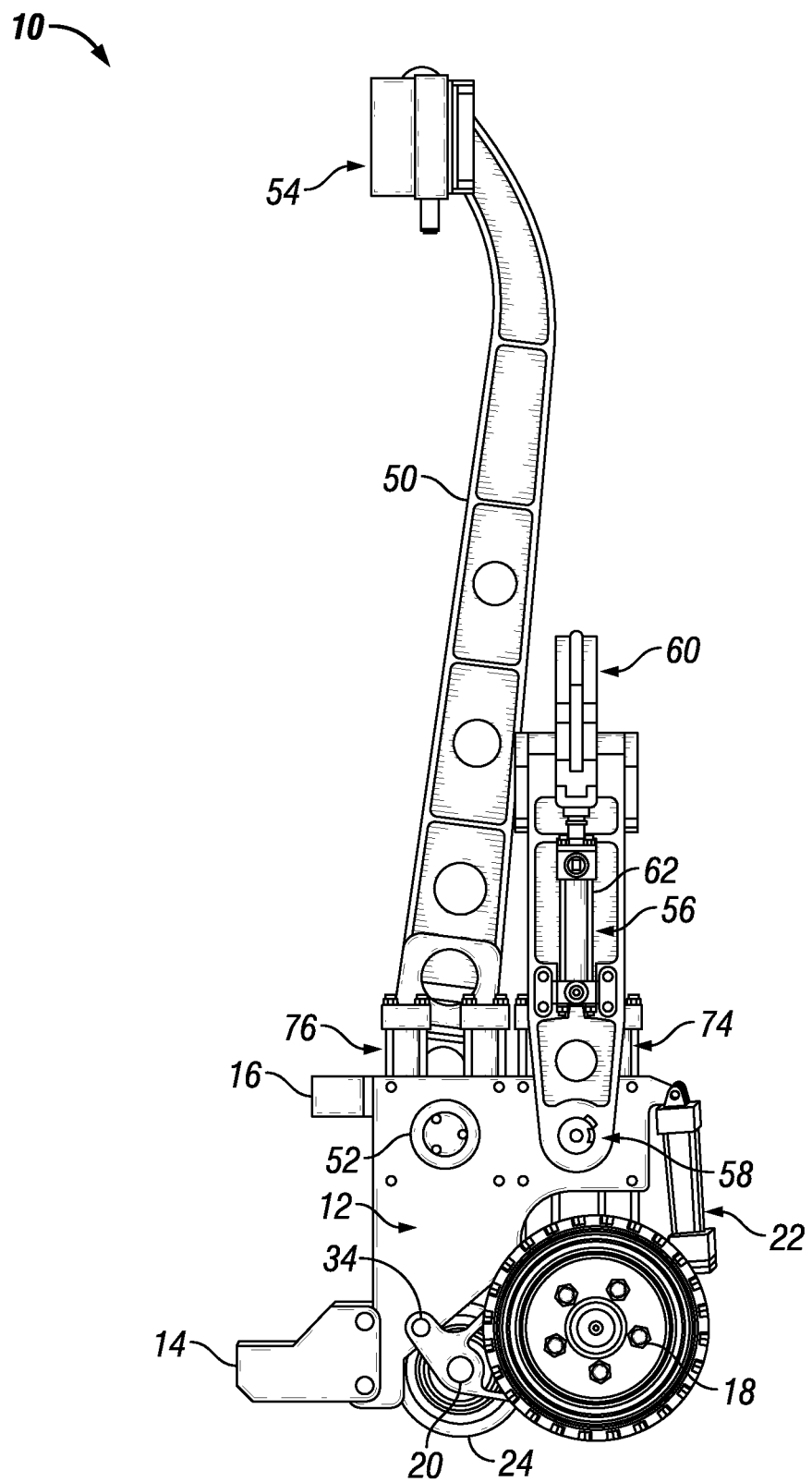
FIG. 4 is an elevation view of a rig-floor pipe lifting machine in accordance with another embodiment.

Turning to FIG. 4, a rig-floor pipe lifting machine 10 in accordance with another embodiment is illustrated. In the embodiment of FIG. 4, the pair of swing arms 20 may be coupled to the frame 12 via an axle 34 located closer to the fork 14 than in the embodiment of FIG. 1. Each of the pair of swing arms 20 may be directly coupled to the frame 12 while remaining rotatable relative to the frame 12. Each of the pair of swing arms 20 may rotate relative to the frame 12 independently of the other. As such, the frame 12 remains rotatable relative to the pair of swing arms 20 around two perpendicular axes. A pair of hydraulic cylinders 22, each having a first cylinder end coupled to one of the pair of swing arms 20 and a second cylinder end coupled to the frame 12, may be used to lift the lower part of the pipe. A caster 24 is still provided at a shorter distance from the first axis corresponding to rotation around the axle 34 than the wheels 18, so that extension of the hydraulic cylinders 22 still causes the caster 24 to be lifted from the rig-floor 104 when a pipe is contacting the fork 14 and the concave pad 16. However, in this embodiment, the caster 24 is mounted on the frame 12.

The rig-floor pipe lifting machine 10 of FIG. 4 further comprises a gripper arm 56 having a first end and a second end. The first end of the gripper arm 56 is rotatably coupled to the frame 12 at joint 58. The gripper arm 56 may be actuated with a pair of hydraulic cylinders 74. A first pipe holding means 60 is coupled to the second end of the gripper arm 56. The first pipe holding means 60 may include a claw, a magnet, or other device known in the art. In the example shown, the first pipe holding means 60 includes a claw actuated by a hydraulic cylinder 62. The rig-floor pipe lifting machine 10 of FIG. 4 further comprises a tailing arm 50 having a first end and a second end. The first end of the tailing arm 50 is rotatably coupled to the frame 12 at joint 52. The tailing arm 50 may be actuated with a pair of hydraulic cylinders 76. A second pipe holding means 54 is rotatably coupled to the second end of the tailing arm 50. The second pipe holding means 54 may include a claw, a magnet, or other device known in the art. In the example shown, the second pipe holding means 54 includes a magnet.

Figure 8:
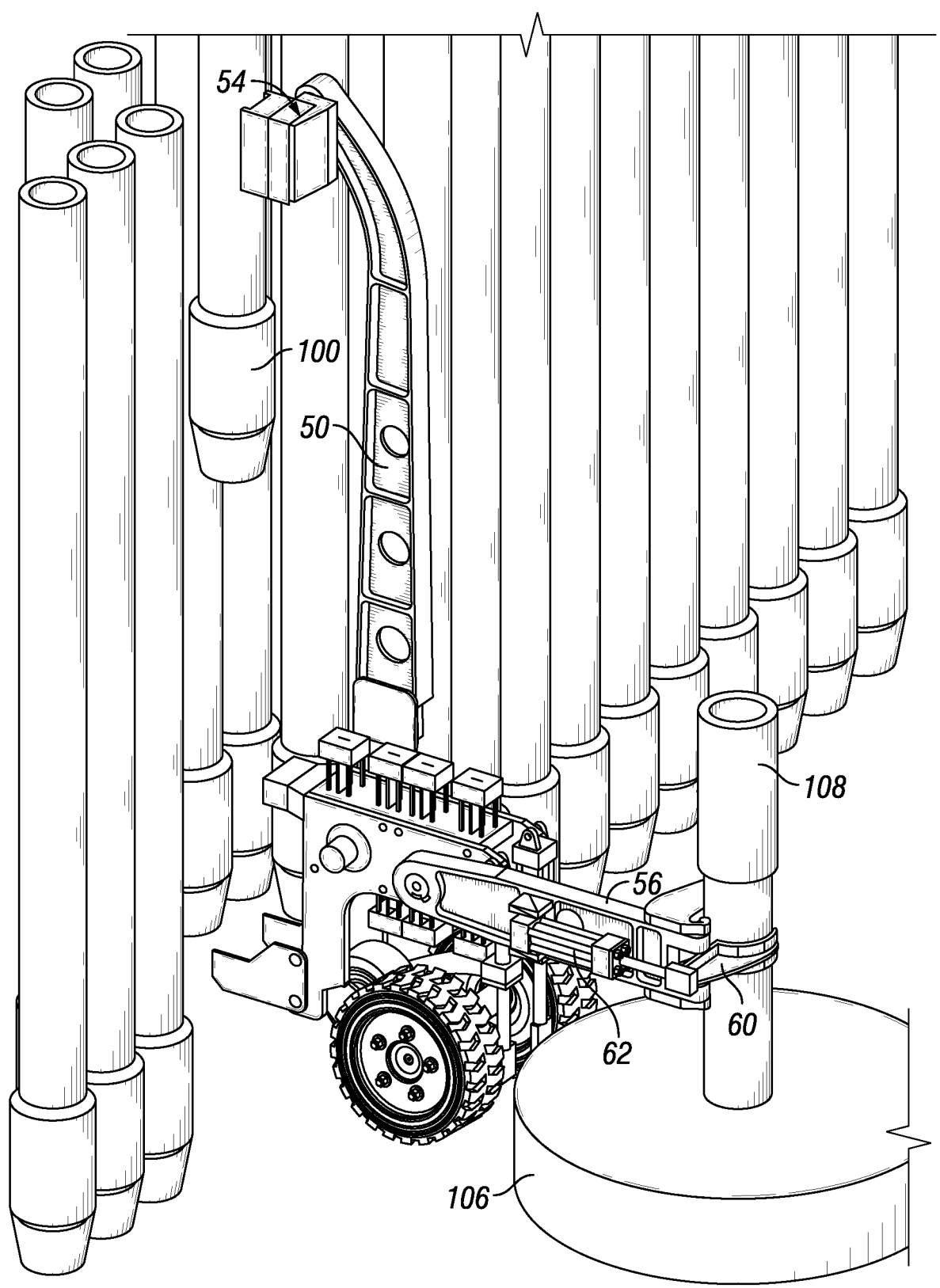
FIGS. 8 and 9 illustrate an example use of the gripping arm or the tailing arm of a rig-floor pipe lifting machine.
Figure 9:
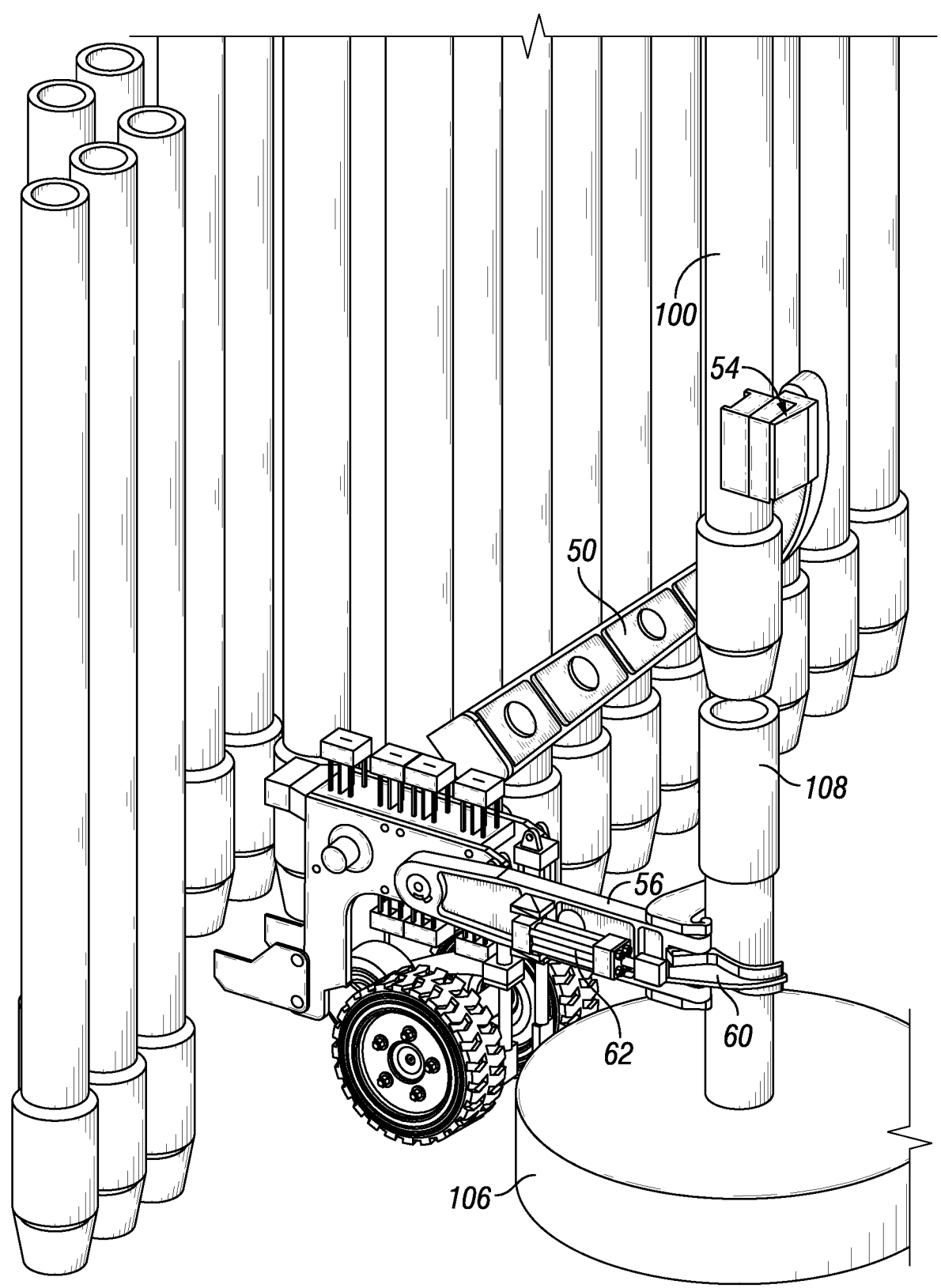

In use, the gripper arm 56 is movable between a first position that is essentially vertical as illustrated in FIG. 4, and a second position that is essentially horizontal as best seen in FIGS. 8 and 9. The tailing arm 50 is movable between a first position wherein the second pipe holding means 54 is located above the fork 14 as best seen in FIG. 8, and a second position wherein the second pipe holding means 54 is located above the first pipe holding means 60 when the gripper arm 56 is essentially horizontal as best seen in FIG. 9.

Figure 5:
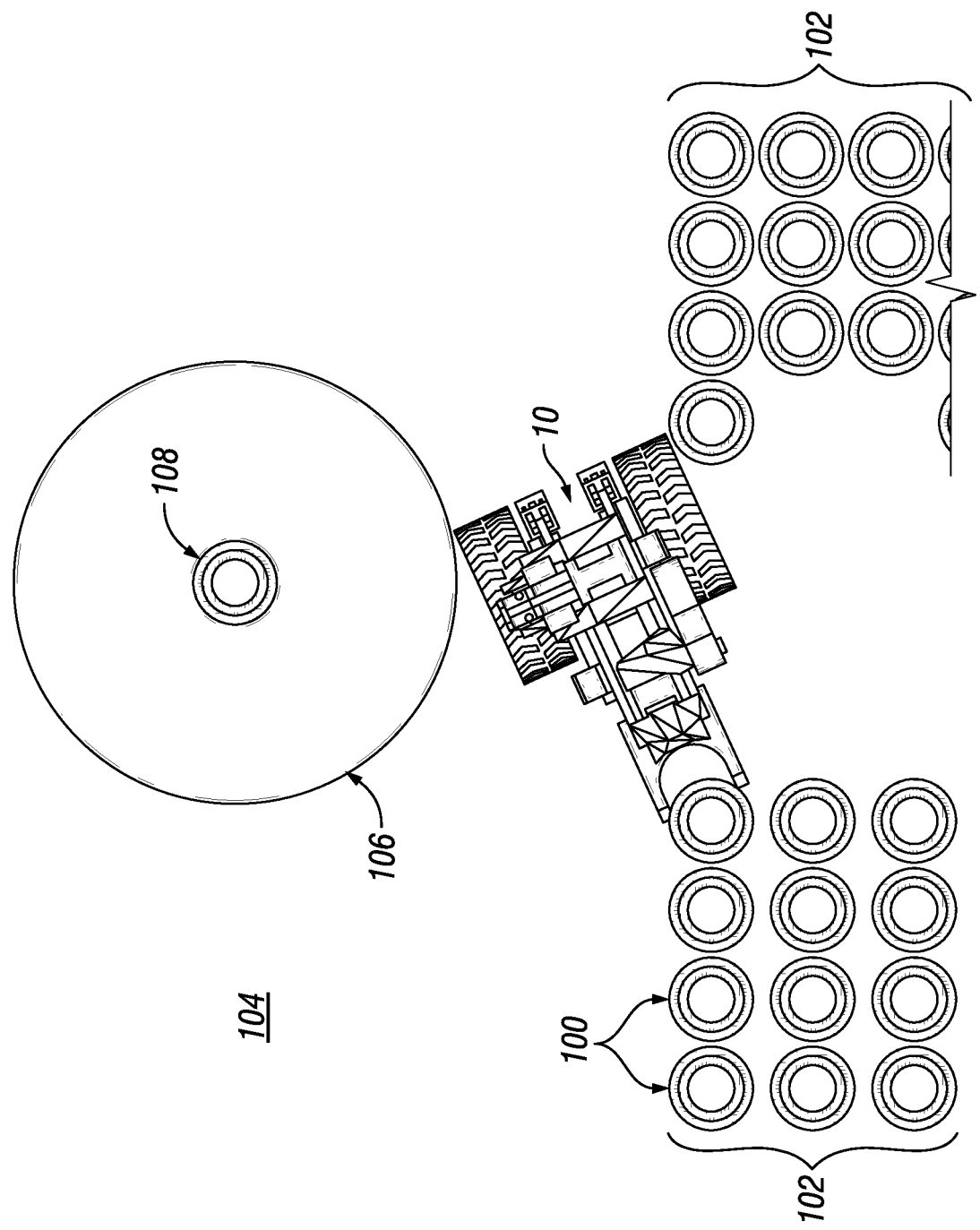
FIG. 5 is a top view of a rig-floor illustrating an example use of a rig-floor pipe lifting machine.

Turning to FIG. 5, the rig-floor pipe lifting machine 10 may be used to control the position of the lower part of one of the pipes 100 while the upper part of the one pipe is held in an elevator suspended from a stand transfer vehicle, a top drive or other handling device of the rig, or constrained between beams of a fingerboard. For example, the rig-floor pipe lifting machine 10 may be used to transfer pipes 100 between a well center 106, a setback area 102, a vee-door area, or other areas of the rig-floor 104.

The rig-floor pipe lifting machine 10 may comprise a navigation system. In some embodiments, the navigation system may comprise a position sensor mounted on the rig-floor pipe lifting machine 10 and a movable marker mounted on a stand transfer vehicle. The position sensor may generate signals indicative of a distance between the position sensor and the movable marker. A controller may be programmed to drive the plurality of wheels 18 based on signals generated by the position sensor.

In other embodiments, the navigation system may only comprise a position sensor mounted to the rig-floor pipe lifting machine 10 and one or more markers (e.g., dashed tracks) fixedly mounted on the rig-floor 104. The position sensor may generate signals indicative of distances between the position sensor and the one or more fixed markers. A controller may be programmed to drive the plurality of wheels 18 based on signals received from the position sensor.

In yet other embodiments, the navigation system may comprise sensors mounted on a link attached between the rig-floor pipe lifting machine 10 and a fixed point (e.g., a post) of the rig-floor 104. The position sensor may generate signals indicative of position or movement of the link. A controller may be programmed to drive the plurality of wheels 18 based on signals received from the position sensor.

The rig-floor pipe lifting machine 10 may be configured for navigating according to any of the following methods: direct slave to the stand transfer vehicle, flight path, manual driving or a combination of thereof. In the direct slave method, the successive positions of a stand transfer vehicle may determine the successive positions of the rig-floor pipe lifting machine 10. In the flight path method, an instruction of destination, and/or an instruction of a particular path determine the successive positions of the rig-floor pipe lifting machine 10. The instruction of destination and/or path may be selected by a user. In the manual driving method, no position sensor may be used, and a user may adjust the position of the rig-floor pipe lifting machine 10 based on where the user sees the rig-floor pipe lifting machine 10 on the rig-floor 104.

The position sensors mounted to the rig-floor pipe lifting machine 10, or the link attached between the rig-floor pipe lifting machine 10 and the rig-floor 104 may be selected from the group consisting of optical sensors such as lidar, ultrasound sensors, radio frequency sensors, or other sensors known in the art.

Figure 6:
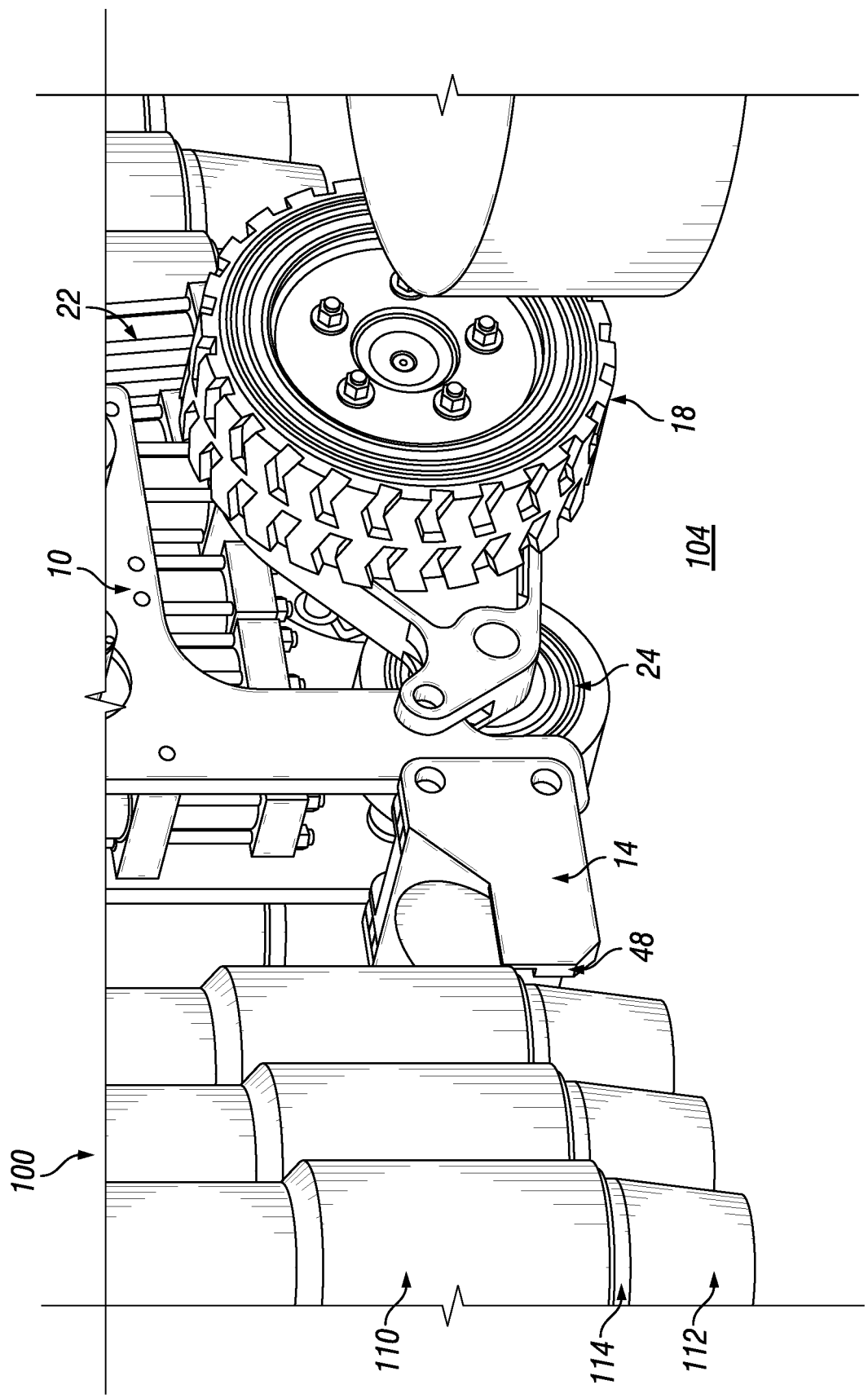
FIGS. 6 and 7 illustrate an example use of the fork of a rig-floor pipe lifting machine.
Figure 7:
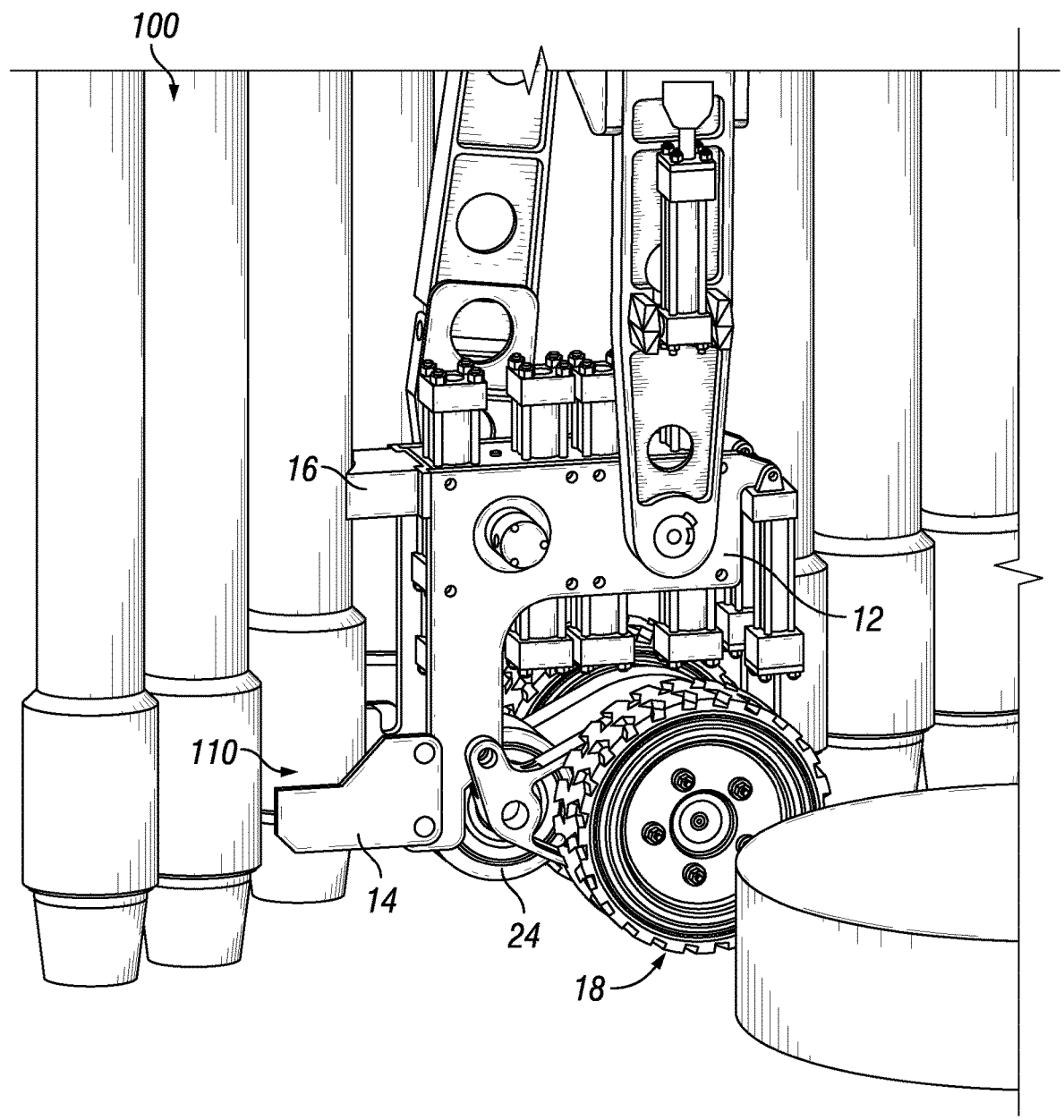

Turning to the sequence of FIGS. 6 and 7, the lifting of the lower part of one of the pipes 100 with the rig-floor pipe lifting machine shown in FIG. 4 is illustrated. The lifting of the lower part of the pipe with the rig-floor pipe lifting machine shown in FIG. 1 would be similar to the illustration of FIGS. 6 and 7.

Typically the lower part of the pipe comprises a male threaded connection including a pin base 112 extending from a tool joint 110. The male threaded connection also includes a primary shoulder 114.

In FIG. 6, the lower part of one of the pipes 100 is shown resting on the rig-floor 104. The upper part of the pipe (not shown) may be constrained between beams of a fingerboard. Each hydraulic cylinder 22 is in the retracted position. Each of the plurality of wheels 18, 24 rests on the rig-floor 104. In this configuration of the rig-floor pipe lifting machine 10, the fork 14 is located close to the rig-floor 104 such that the prongs 48 may pass under the primary shoulder 114. As such, the rig-floor pipe lifting machine 10 may be positioned next to the pipe until the concave pad 16 contacts the pipe.

Turning to FIG. 7, each hydraulic cylinder 22 has been extended. As the frame 12 is lifted, the fork 14 may engage the tool joint 110 of the pipe and lift the pipe from the rig-floor 104. At the same time, the caster 24 is also lifted from the rig-floor 104. After extension of the hydraulic cylinders 22, the upper part of the pipe may be displaced without displacing the lower part of the pipe by inclining the rig-floor pipe lifting machine 10.

In some embodiments, the gripper arm 56 and the tailing arm 50 of the rig-floor pipe lifting machine 10 may be used to align the lower part of the pipe above a drillstring 108 sticking up from the well center 106. In other embodiments, a positioning arm (not shown) connected to an iron roughneck may alternatively be used to align the lower part of the pipe above the drillstring 108.

Turning to the sequence of FIGS. 8 and 9, the aligning of the lower part of the pipe above the drillstring 108 with the rig-floor pipe lifting machine shown in FIG. 4 is illustrated.

In FIG. 8, the rig-floor pipe lifting machine 10 may have received an instruction to navigate to a position directly adjacent to well center 106. The controller of the navigation system may further be programmed to move the gripper arm 56 during navigation from an essentially vertical position to an essentially horizontal as shown. Using the hydraulic cylinder 62, the controller may cause the claw to open also during navigation. Then, the controller may cause the first holding means 60 to connect to the drillstring 108. For example, the claw may close on the drillstring 108. Further, the controller may cause the tailing arm 50 to tilt forward and to connect the second holding means 54 to the pipe. A top drive elevator may now be taking the pipe from the stand transfer vehicle.

The gripper arm 56 may serve at least two purposes. First, closing the claw on the drillstring 108 may cause the rig-floor pipe lifting machine 10 to shift position. As such, the gripper arm 56 may be used to better position the rig-floor pipe lifting machine 10 relative to the drillstring 108. Second, because the gripper arm 56 is attached to the drillstring 108, which is in turn attached to the well center 106 with slips, the gripper arm 56 may be used to prevent the rig-floor pipe lifting machine 10 from toppling over under the forces applied by the pipe to the tailing arm 50.

In FIG. 9, the tailing arm 50 is still connected to the lower part of the pipe via the second hold means 54. The tailing arm 50 is used to control the position of the lower part of the pipe as the top drive elevator moves the upper part of the pipe over the drillstring 108 for connection thereto.

While FIGS. 6, 7, 8 and 9 show a sequence where a pipe is displaced on the rig-floor 104 from a setback area 102 to a well center 106, and then connected to a drillstring, persons having ordinary skills in the art given the benefit of the disclosure will appreciate that the rig-floor pipe lifting machine 10 may be operated to perform other sequences, including, but not limited to, displacing a pipe from the well center 106 to the setback area 102.

Figure 10:
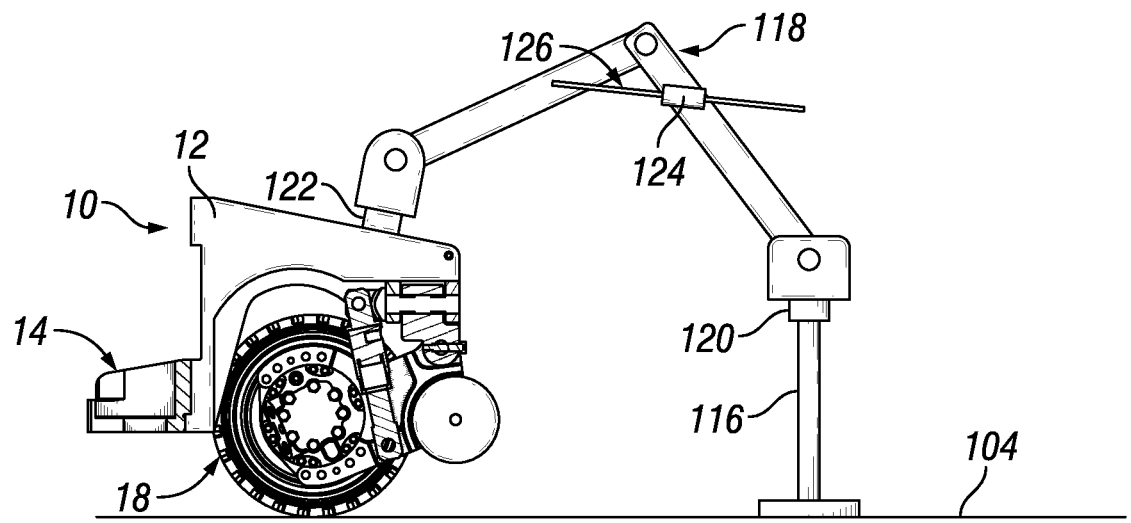
FIG. 10 is a side view illustrating one embodiment of a navigation system for a rig-floor pipe lifting machine, the navigation system including sensors mounted on an articulated link.

Turning to FIG. 10, a first embodiment of a navigation system for the rig-floor pipe lifting machine 10 includes position or movement sensors 120, 122 and 124 mounted on a link, such as an articulated arm 118 and post 116. The link is attached between the rig-floor 104 and the rig-floor pipe lifting machine 10. The sensor 120 may measure the rotation in the horizontal plane between the post 116 and the articulated arm 118. The sensor 122 may measure a rotation between the articulated arm 118 and the frame 12 of the rig-floor pipe lifting machine 10. A rod 126 may be coupled to one end to the articulated arm 118 and may slide through the sensor 124 (e.g., a linear variable differential transformer) also coupled to the articulated arm 118.

Pressurized fluid may be provided to the hydraulic motors (e.g., the first motor 36 in FIG. 1) of the rig-floor pipe lifting machine 10 via hoses (not shown) running along the articulated arm 118.

The signals of the sensors 120, 122, and 124 may be processed to determine the position of the rig-floor pipe lifting machine 10 on the rig-floor 104, as well as the orientation of the fork 14. The navigation system may include a controller that is programmed to drive at least one of the plurality of wheels 18 based on the determined positions and orientation, and the instruction of a path or destination selected by a user.

Figure 11:
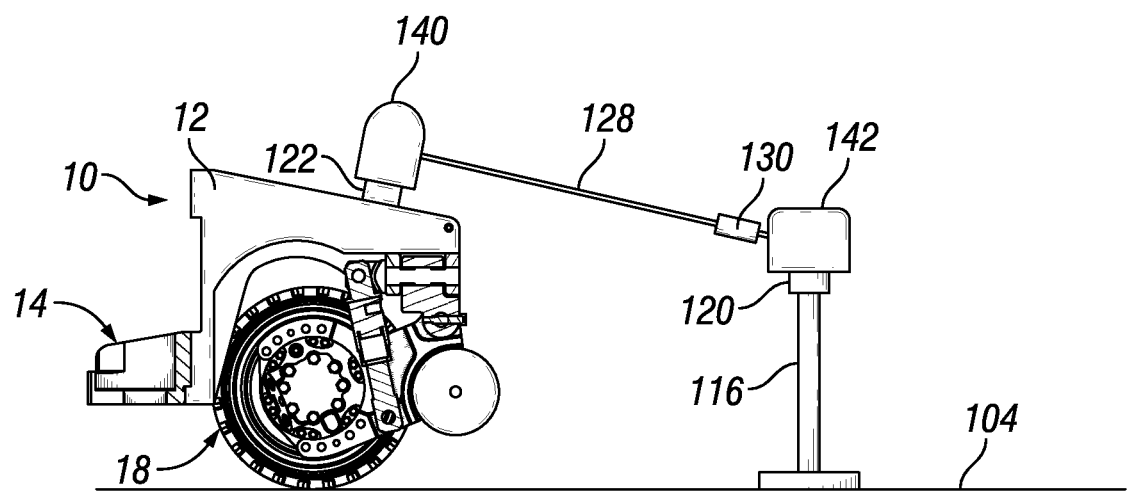
FIG. 11 is a side view illustrating another embodiment of a navigation system for a rig-floor pipe lifting machine, the navigation system including sensors mounted on an extendable link.

Turning to FIG. 11, a second embodiment of a navigation system for the rig-floor pipe lifting machine 10 includes position or movement sensors 120, 122 and 130 mounted on a link, such as including a tensioning cable 128, rotatable heads 140, 142 and post 116. The tensioning cable 128 may be wound on a reel coupled to the post 116. The tension in the tensioning cable 128 may be sufficient to ensure alignment of the rotatable heads 140 and 142 along the direction of the tensioning cable 128. Thus, the sensor 120 may measure the rotation in the horizontal plane between the post 116 and the tensioning cable 128. The sensor 122 may measure a rotation between the tensioning cable 128 and the frame 12 of the rig-floor pipe lifting machine 10. The sensor 130 may measure the winding and unwinding of the tensioning cable 128.

The signals of the sensors 120, 122, and 130 may be processed to determine the position of the rig-floor pipe lifting machine 10 on the rig-floor 104, as well as the orientation of the fork 14. The navigation system may include a controller that is programmed to drive at least one of the plurality of wheels 18 based on the determined positions and orientation, and the instruction of a path or destination selected by a user.

Figure 12:
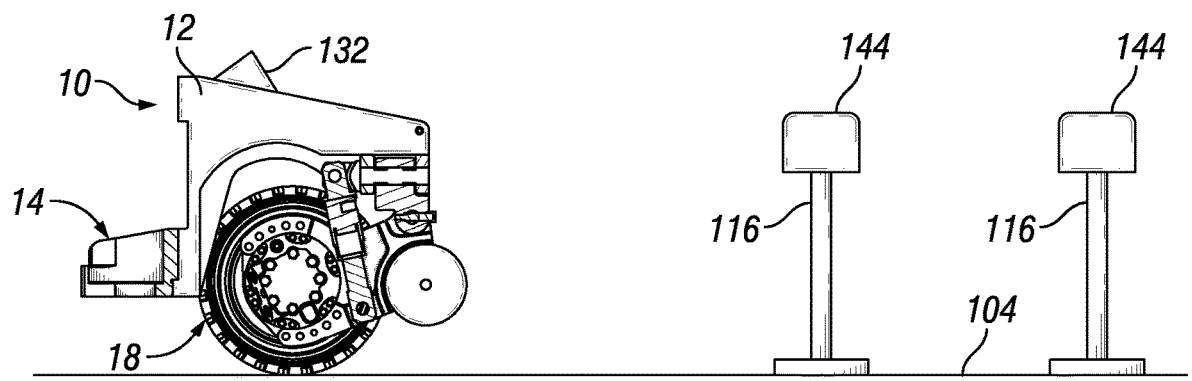
FIG. 12 is a side view illustrating another embodiment of a navigation system for a rig-floor pipe lifting machine, the navigation system including a sensor for measuring a distance to one or more posts.

Turning to FIG. 12, a third embodiment of a navigation system for the rig-floor pipe lifting machine 10 includes a plurality of fixed markers 144 mounted on the rig-floor 104, for example on posts 116, and a position sensor 132 mounted to the rig-floor pipe lifting machine 10. The position sensor 132 generates signals indicative of a distance between the position sensor 132 and each of the plurality of fixed markers 144, and signal indicative of a direction between the orientation of the fork 14 and at least one of the plurality of fixed markers 144. For example, the position sensor 132 may include a lidar.

The distance and direction signals may be processed to determine the position of the rig-floor pipe lifting machine 10 on the rig-floor 104, as well as the orientation of the fork 14. The navigation system may include a controller that is programmed to drive at least one of the plurality of wheels 18 based on the determined positions and orientation, and the instruction of a path or destination selected by a user.

Figure 13:
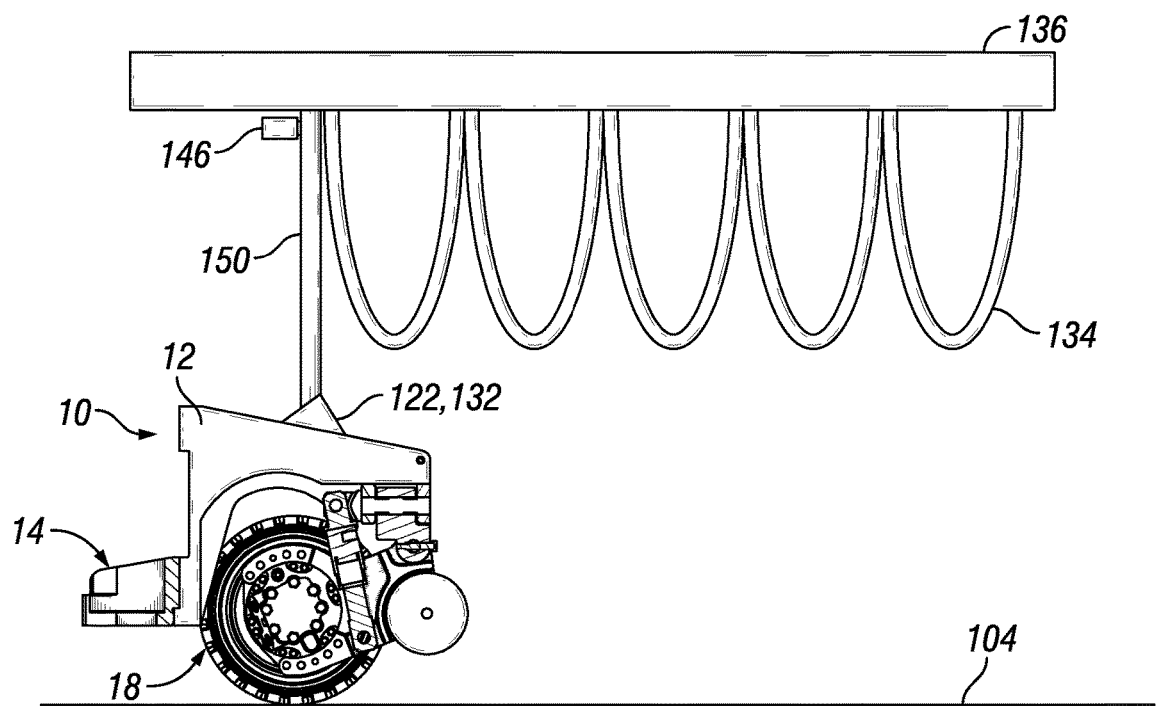
FIG. 13 is a side view illustrating another embodiment of a navigation system for a rig-floor pipe lifting machine, the navigation system including sensors mounted on a stand transfer vehicle and/or on the rig-floor pipe lifting machine.

Turning to FIG. 13, a fourth embodiment of a navigation system for the rig-floor pipe lifting machine 10 includes one or more movable marker(s) 146 mounted on a stand transfer vehicle 136, and a position sensor 132 mounted to the rig-floor pipe lifting machine 10. The position sensor 132 generates signals indicative of a distance between the position sensor 132 and the one or more movable marker(s) 146. Alternatively, the one or more movable marker(s) 146 may be mounted on the rig-floor pipe lifting machine 10, and the position sensor 132 may be mounted on the stand transfer vehicle 136. For example, the position sensor 132 may include a lidar. In addition, a sensor 122 may measure a rotation between a link including a supply pipe 150 and the frame 12 of the rig-floor pipe lifting machine 10.

Pressurized fluid may be provided to the hydraulic motors (e.g., the first motor 36 in FIG. 1) of the rig-floor pipe lifting machine 10 via the catenary 134 running along the stand transfer vehicle 136 and via the supply pipe 150.

The signals generated by the sensors 122 and 132 may be processed to determine the position of the rig-floor pipe lifting machine 10 on the rig-floor 104, as well as the orientation of the fork 14. The navigation system may include a controller that is programmed to drive at least one of the plurality of wheels 18 based on the determined positions and orientation, and the instruction of a path or destination selected by a user.

Figure 14:
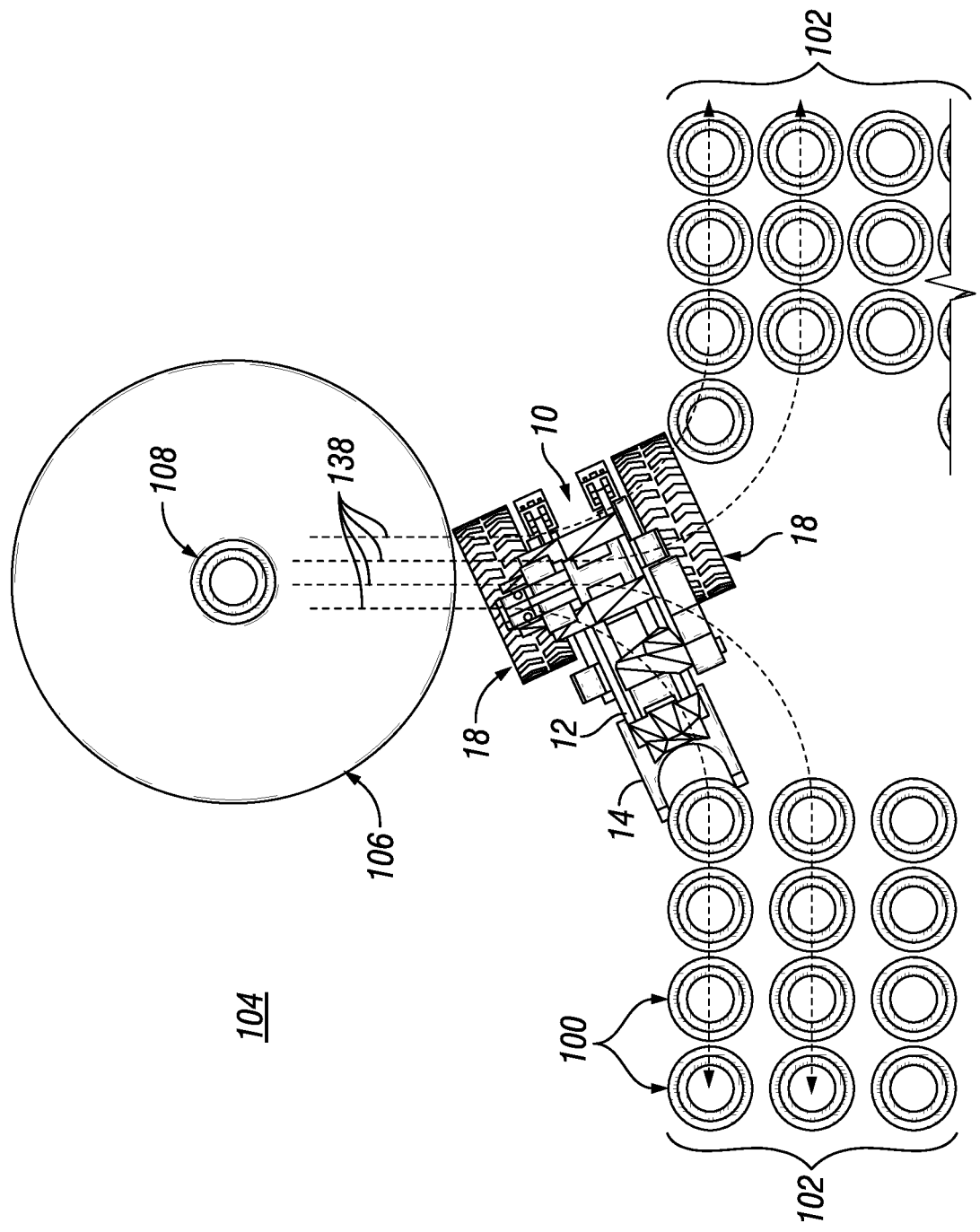
FIG. 14 is a top view illustrating another embodiment of a navigation system for a rig-floor pipe lifting machine, the navigation system including sensors for detecting tracks disposed on the rig-floor.

Turning to FIG. 14, a fifth embodiment of a navigation system for a rig-floor pipe lifting machine 10 includes one or more position sensor(s) mounted on the rig-floor pipe lifting machine 10 for detecting tracks 138 disposed on the rig-floor. The one or more sensor(s) may generate signals indicative of a lateral distance between the one or more position sensor(s) and one of the tracks 138, and/or signals indicative of an orientation of the fork 14 relative to the direction of the one track.

The tracks 138 may be arranged to define paths between a well center 106, a setback area 102, a vee-door area, or other areas of the rig-floor 104. The tracks 138 may be continuous or dashed. Different tracks may correspond to parallel rows of pipes 100.

The tracks may include electromagnetic strips. The electromagnetic strips may be directly attached to the rig-floor 104 or may be attached to a mat or other surface covering the rig-floor 104. The electromagnetic field emitted by each portion of the strip may vary along the length of each strip. The strips may be continuous or dashed. Optionally, the one or more position sensor(s) generates signals indicative of a position of the rig-floor pipe lifting machine 10 along a length of the strip, for example by measuring the variation of the electromagnetic field, and/or by measuring the interruptions of magnetic field. Alternatively, the tracks 138 may include grooves.

While FIGS. 10-14 are illustrated as separate embodiments of navigation systems, the embodiments may be recombined in different ways.

While the disclosure is susceptible to various modifications and alternative forms, specific embodiments thereof are shown by way of example in the drawings and description. It should be understood, however, that the drawings and detailed description thereto are not intended to limit the claims to the particular form disclosed, but on the contrary, the intention is to cover all modifications, equivalents, and alternatives falling within the scope of the claims.

What is claimed is:

1. A rig-floor pipe lifting machine for use with a pipe positioned vertically, comprising:
a frame;
a pair of swing arms rotatable relative to the frame around a first axis;
a plurality of wheels mounted on the pair of swing arms;

a fork coupled to the frame and sized to engage a lowermost tool-joint of the pipe;

a concave pad coupled to the frame and aligned with the fork; and an actuator having a first end coupled to at least one of the pair of swing arms and a second end coupled to the frame, wherein the fork is positioned below the concave pad and such that at least a portion of the fork is capable of passing under the lowermost tool joint of the pipe when the pipe is resting on the rig-floor, the hydraulic cylinder is contracted, and each the plurality of wheels rests on the rig-floor, wherein extension of the actuator causes the fork and the concave pad to be lifted from the rig-floor.

2. The rig-floor pipe lifting machine of claim 1, further comprising:

at least one spring having a first spring end coupled to one of the pair of swing arms and a second spring end coupled to the frame, wherein the pair of swing arms is further rotatable relative to the frame around a second axis, the second axis being perpendicular to the first axis, and wherein the first spring end is offset relative to the second axis.

3. The rig-floor pipe lifting machine of claim 1, wherein the plurality of wheels comprises:

a first wheel coupled to one of the pair of swing arms at a first distance from the first axis;

a second wheel coupled to another one of the pair of swing arms at the first distance from the first axis; and a caster coupled to the pair of swing arms or to the frame at a second distance from the first axis, wherein the second distance is shorter than the first distance.

4. The rig-floor pipe lifting machine of claim 1, wherein the fork includes:

a first cylindrical inner surface having a first diameter sized to fit around a pin base of the pipe;

a shoulder surface radially sized to support a primary shoulder of a connection of the pipe; and a pair of prongs disposed above the shoulder surface and separated by a distance shorter than a diameter of the lowermost tool-joint.

5. The rig-floor pipe lifting machine of claim 4, wherein the fork further includes:

a second cylindrical inner surface having a second diameter sized to fit around the lowermost tool-joint of the pipe.

6. The rig-floor pipe lifting machine of claim 1, further comprising:

a gripper arm having a first end and a second end, the first end of the gripper arm being rotatably coupled to the frame; and first pipe holding means coupled to the second end of the gripper arm, wherein the gripper arm is movable between a first position that is essentially vertical and a second position that is essentially horizontal.

7. The rig-floor pipe lifting machine of claim 6, further comprising:

a tailing arm having a first end and a second end, the first end of the gripper arm being rotatably coupled to the frame; and second pipe holding means rotatably coupled to the second end of the tailing arm, the tailing arm being movable between a first position wherein the second pipe holding means is located above the fork, and a second position wherein the second pipe holding means is located above the first pipe holding means when the gripper arm is essentially horizontal.

8. The rig-floor pipe lifting machine of claim 1, further comprising a navigation system including:

a movable marker mounted on a stand transfer vehicle;

a position sensor mounted on the rig-floor pipe lifting machine, wherein the position sensor generates signals indicative of a distance between the position sensor and the movable marker; and a controller programmed to drive at least one of the plurality of wheels based on the signals.

9. The rig-floor pipe lifting machine of claim 1, further comprising a navigation system including:

a plurality of fixed markers mounted on a rig-floor;

a position sensor mounted to the rig-floor pipe lifting machine, wherein the position sensor generates signals indicative of a distance between the position sensor and each of the plurality of fixed markers; and a controller programmed to drive at least one of the plurality of wheels based on the signals.

10. The rig-floor pipe lifting machine of claim 1, further comprising a navigation system including:

a link attached between the rig-floor pipe lifting machine and a rig-floor;

a plurality of position sensors mounted on the link, wherein each of the plurality of position sensors generates signals indicative of a position or a movement of the link; and a controller programmed to drive at least one of the plurality of wheels based on the signals.

11. The rig-floor pipe lifting machine of claim 1, wherein the actuator is a hydraulic cylinder having a first cylinder end coupled to at least one of the pair of swing arms and a second cylinder end coupled to the frame.

12. The rig-floor pipe lifting machine of claim 11, further comprising:

a first motor rotationally coupled to a first one of the plurality of wheels; and a second motor rotationally coupled to a second one of the plurality of wheels, wherein the first motor is driven independently from the second motor.

13. The rig-floor pipe lifting machine of claim 12, wherein the first motor and the second motor are hydraulic motors.

14. A system for use with a pipe positioned vertically, comprising:

a rig-floor pipe lifting machine, including a frame, a pair of swing arms rotatable relative to the frame around a first axis, a plurality of wheels mounted on the pair of swing arms, a fork coupled to the frame and sized to engage a lowermost tool joint of the pipe, a concave pad coupled to the frame and aligned with the fork, and an actuator having a first end coupled to at least one of the pair of swing arms and a second end coupled to the frame; and an elevator suspended from one of a stand transfer vehicle, a top drive or other lifting device of a drilling rig, wherein the fork is positioned below the concave pad and such that at least a portion of the fork is capable of passing under the lowermost tool joint of the pipe when the pipe is resting on the rig-floor, the hydraulic cylinder is contracted, and each the plurality of wheels rests on the rig-floor, wherein extension of the actuator causes the fork and the concave pad to be lifted from the rig-floor.

15. The system of claim 14, wherein the rig-floor pipe lifting machine further comprises:

at least one spring having a first spring end coupled to one of the pair of swing arms and a second spring end coupled to the frame, wherein the pair of swing arms is further rotatable relative to the frame around a second axis, the second axis being perpendicular to the first axis, and wherein the first spring end is offset relative to the second axis.

16. The system of claim 14, wherein the plurality of wheels comprises:

a first wheel coupled to one of the pair of swing arms at a first distance from the first axis;

a second wheel coupled to another one of the pair of swing arms at the first distance from the first axis; and a caster coupled to the pair of swing arms or to the frame at a second distance from the first axis, wherein the second distance is shorter than the first distance.

17. The system of claim 14, wherein the fork includes:

a first cylindrical inner surface having a first diameter sized to fit around a pin base of the pipe;

a shoulder surface radially sized to support a primary shoulder of a connection of the pipe; and a pair of prongs disposed above the shoulder surface and separated by a distance shorter than a diameter of the lowermost tool-joint.

18. The system of claim 17, wherein the fork further includes:

a second cylindrical inner surface having a second diameter sized to fit around the lowermost tool-joint of the pipe.

19. The system of claim 14, wherein the rig-floor pipe lifting machine further comprises:

a gripper arm having a first end and a second end, the first end of the gripper arm being rotatably coupled to the frame; and first pipe holding means coupled to the second end of the gripper arm, wherein the gripper arm is movable between a first position that is essentially vertical and a second position that is essentially horizontal.

20. The system of claim 19, wherein the rig-floor pipe lifting machine further comprises:

a tailing arm having a first end and a second end, the first end of the gripper arm being rotatably coupled to the frame; and second pipe holding means rotatably coupled to the second end of the tailing arm, the tailing arm being movable between a first position wherein the second pipe holding means is located above the fork, and a second position wherein the second pipe holding means is located above the first pipe holding means when the gripper arm is essentially horizontal.

21. The system of claim 14, further comprising a navigation system including:

a movable marker mounted on a stand transfer vehicle;

a position sensor mounted on the rig-floor pipe lifting machine, wherein the position sensor generates signals indicative of a distance between the position sensor and the movable marker; and a controller programmed to drive at least one of the plurality of wheels based on the signals.

22. The system of claim 14, further comprising a navigation system including:

a plurality of fixed markers mounted on a rig-floor;

a position sensor mounted to the rig-floor pipe lifting machine, wherein the position sensor generates signals indicative of a distance between the position sensor and each of the plurality of fixed markers; and a controller programmed to drive at least one of the plurality of wheels based on the signals.

23. The system of claim 14, further comprising a navigation system including:

a link attached between the rig-floor pipe lifting machine and a rig-floor;

a plurality of position sensors mounted on the link, wherein each of the plurality of position sensors generates signals indicative of a position or a movement of the link; and a controller programmed to drive at least one of the plurality of wheels based on the signals.

24. The system of claim 14, wherein the actuator is a hydraulic cylinder having a first cylinder end coupled to at least one of the pair of swing arms and a second cylinder end coupled to the frame.

25. The system of claim 24, wherein the rig-floor pipe lifting machine further comprises:

a first motor rotationally coupled to a first one of the plurality of wheels; and a second motor rotationally coupled to a second one of the plurality of wheels, wherein the first motor is driven independently from the second motor.

26. The system of claim 25, wherein the first motor and the second motor are hydraulic motors.

* * * * *

UNITED STATES PATENT AND TRADEMARK OFFICE
CERTIFICATE OF CORRECTION

PATENT NO. : 10,745,985 B2
APPLICATION NO. : 15/978765
DATED : August 18, 2020
INVENTOR(S) : Miller et al.

Page 1 of 1

It is certified that error appears in the above-identified patent and that said Letters Patent is hereby corrected as shown below:

In the Claims

Column 11, Lines 11-12, In Claim 1, "the hydraulic cylinder is contracted" should read --the actuator is contracted--.
Column 11, Lines 62-63, In Claim 7, "the first end of the gripper arm" should read --the first end of the tailing arm--.
Column 13, Lines 1-2, In Claim 14, "the hydraulic cylinder is contracted" should read --the actuator is contracted--.
Column 13, Lines 51-52, In Claim 20, "the first end of the gripper arm" should read --the first end of the tailing arm--.

Signed and Sealed this
Twenty-seventh Day of October, 2020

Andrei Iancu
*Director of the United States Patent and Trademark Office*